US012181827B2

(12) United States Patent
Williamson

(10) Patent No.: US 12,181,827 B2
(45) **Date of Patent: *Dec. 31, 2024**

(54) TONER CARTRIDGE LATCHING

(71) Applicant: LEXMARK INTERNATIONAL, INC., Lexington, KY (US)

(72) Inventor: Randal Scott Williamson, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,470

(22) Filed: Jun. 19, 2023

(65) Prior Publication Data

US 2023/0333507 A1 Oct. 19, 2023

Related U.S. Application Data

(60) Continuation of application No. 17/674,303, filed on Feb. 17, 2022, now Pat. No. 11,720,048, which is a division of application No. 16/736,864, filed on Jan. 8, 2020, now Pat. No. 11,287,770.

(60) Provisional application No. 62/946,638, filed on Dec. 11, 2019.

(51) Int. Cl.
*G03G 21/16* (2006.01)
*G03G 21/18* (2006.01)

(52) U.S. Cl.
CPC ..... *G03G 21/1647* (2013.01); *G03G 21/1676* (2013.01); *G03G 21/1821* (2013.01)

(58) Field of Classification Search
None
See application file for complete search history.

(56) References Cited

U.S. PATENT DOCUMENTS 11,720,048 B2 * 8/2023 Williamson ....... G03G 21/1821 399/41
2015/0205254 A1 7/2015 Fujii et al.
2017/0075297 A1 3/2017 Eto

OTHER PUBLICATIONS

Extended European Search Report dated Sep. 15, 2023 for European Patent Application No. 20898563.0.

* cited by examiner

*Primary Examiner* — Walter L Lindsay, Jr.
*Assistant Examiner* — Geoffrey T Evans
(74) *Attorney, Agent, or Firm* — Justin M. Tromp

(57) ABSTRACT

A first replaceable unit is provided for use with a second replaceable unit in an electrophotographic image forming device. The first replaceable unit includes a latch movable between a latching position for latching the first replaceable unit to the second replaceable unit and an unlatching position for permitting the first replaceable unit to separate from the second replaceable unit. The latch is positioned to contact a latch catch on the second replaceable unit in order to prevent the first replaceable unit from separating from the second replaceable unit when the first replaceable unit is mated with the second replaceable unit and the latch is in the latching position. The latch includes a cam follower surface for contacting a camming surface on the second replaceable unit during mating of the first replaceable unit with the second replaceable unit to cause the latch to move toward the latching or unlatching position.

8 Claims, 16 Drawing Sheets

TONER CARTRIDGE LATCHING

CROSS REFERENCES TO RELATED APPLICATIONS

This application is a continuation application of U.S. patent application Ser. No. 17/674,303, filed Feb. 17, 2022, entitled "Toner Cartridge Latching," which is a divisional application of U.S. patent application Ser. No. 16/736,864, filed Jan. 8, 2020, now U.S. Pat. No. 11,287,770, issued Mar. 29, 2022, entitled "Toner Cartridge Latching," which claims priority to U.S. Provisional Patent Application Ser. No. 62/946,638, filed Dec. 11, 2019, entitled "Toner Cartridge Latching," the contents of which are hereby incorporated by reference in their entirety.

BACKGROUND

1. Field of the Disclosure

The present disclosure relates generally to image forming devices and more particularly to toner cartridge latching.

2. Description of the Related Art

In order to reduce the premature replacement of components traditionally housed within a toner cartridge for an image forming device, it is now common practice in toner cartridge design to separate components having a longer life from those having a shorter life into separate replaceable units. Relatively longer life components are positioned in one replaceable unit (an imaging unit). The image forming device's toner supply, which is consumed relatively quickly in comparison with the components housed in the imaging unit, is provided in a reservoir in a separate replaceable unit in the form of a toner cartridge that feeds toner to the imaging unit. In this configuration, the number of components housed in the toner cartridge is reduced in comparison with traditional toner cartridges.

Various error conditions in the image forming device may require the removal of both the toner cartridge and the imaging unit by the user in order for the user to access an inner area of the image forming device to correct the error, e.g., to clear a media jam. The removal of both the toner cartridge and the imaging unit from the image forming device may be cumbersome for the user if the user needs to set one or both units down in order to free a hand to perform corrective actions within the image forming device. The toner cartridge and the imaging unit may also be prone to damage due to user carelessness or inattention when removing or setting down one or both units.

SUMMARY

A first replaceable unit for use with a second replaceable unit in an electrophotographic image forming device includes a housing having a reservoir for holding toner. The first replaceable unit includes a latch movable relative to the housing between a latching position for latching the first replaceable unit to the second replaceable unit and an unlatching position for permitting the first replaceable unit to separate from the second replaceable unit. The latch includes a latching contact surface for contacting a corresponding latch catch on the second replaceable unit in order to prevent the first replaceable unit from separating from the second replaceable unit when the first replaceable unit is mated with the second replaceable unit and the latch is in the latching position. The latch includes a first cam follower surface for contacting a corresponding first camming surface on the second replaceable unit during mating of the first replaceable unit with the second replaceable unit to cause the latch to move toward the unlatching position to clear the corresponding latch catch during mating of the first replaceable unit with the second replaceable unit. The latch includes a second cam follower surface for contacting a corresponding second camming surface on the second replaceable unit during mating of the first replaceable unit with the second replaceable unit to cause the latch to move toward the latching position to position the latch in the latching position when the first replaceable unit is fully mated with the second replaceable unit. In some embodiments, the first replaceable unit includes an outlet in fluid communication with the reservoir for exiting toner from the housing to the second replaceable unit. In some embodiments, the outlet is positioned on the front of the housing, and the latch is positioned on the rear of the housing.

Embodiments include those wherein the latch is rotatable about a rotational axis relative to the housing between the latching position and the unlatching position. In some embodiments, the latch includes a first extension and a second extension spaced angularly relative to the rotational axis from the first extension. The latching contact surface is positioned on the first extension, and the second cam follower surface is positioned on the second extension. In some embodiments, the first cam follower surface is positioned on the first extension. In some embodiments, the latch includes a third extension spaced angularly relative to the rotational axis from the first extension and from the second extension. The third extension includes a handle permitting a user to manually rotate the latch between the latching position and the unlatching position.

In some embodiments, the first replaceable unit does not include a biasing member biasing the latch relative to the housing toward the latching position or toward the unlatching position.

A toner cartridge for use with an imaging unit in an electrophotographic image forming device according to one example embodiment includes a housing having a top, a bottom, a front and a rear positioned between a first side and a second side of the housing. The housing has a reservoir for holding toner. An outlet in fluid communication with the reservoir is positioned on the front of the housing for exiting toner from the housing. A latch is positioned on the rear of the housing. The latch is rotatable about a rotational axis relative to the housing between a latching position for latching the toner cartridge to the imaging unit and an unlatching position for permitting the toner cartridge to separate from the imaging unit. The latch includes a locking extension for contacting a corresponding latch catch on the imaging unit in order to prevent the toner cartridge from separating from the imaging unit when the toner cartridge is mated with the imaging unit and the latch is in the latching position. The latch includes a camming extension spaced angularly from the locking extension relative to the rotational axis. The camming extension includes a first cam follower surface for contacting a corresponding first camming surface on the imaging unit during mating of the toner cartridge with the imaging unit to cause the latch to rotate in a first rotational direction. In some embodiments, the rotational axis extends along a front-to-rear dimension of the housing.

Embodiments include those wherein the locking extension extends downward from the rotational axis and toward the bottom of the housing when the latch is in the latching position.

In some embodiments, the locking extension includes a hook for contacting the corresponding latch catch on the imaging unit in order to prevent the toner cartridge from separating from the imaging unit when the toner cartridge is mated with the imaging unit and the latch is in the latching position.

Embodiments include those wherein the locking extension includes a second cam follower surface for contacting a corresponding second camming surface on the imaging unit during mating of the toner cartridge with the imaging unit to cause the latch to rotate in a second rotational direction that is opposite the first rotational direction. In some embodiments, the first cam follower surface is positioned to contact the corresponding first camming surface on the imaging unit during mating of the toner cartridge with the imaging unit to cause the latch to rotate toward the latching position to position the latch in the latching position when the toner to cartridge is fully mated with the imaging unit, and the second cam follower surface is positioned to contact the corresponding second camming surface on the imaging unit during mating of the toner cartridge with the imaging unit to cause the latch to rotate toward the unlatching position to clear the corresponding latch catch on the imaging unit during mating of the toner cartridge with the imaging unit.

Embodiments include those wherein the latch includes a handle extension spaced angularly relative to the rotational axis from the locking extension and from the camming extension permitting a user to manually rotate the latch between the latching position and the unlatching position. In some embodiments, the handle extension extends opposite the camming extension relative to the rotational axis, and the locking extension is positioned between the handle extension and the camming extension.

Embodiments include those wherein the toner cartridge does not include a biasing member biasing the latch relative to the housing toward the latching position or toward the unlatching position.

Some embodiments include a first rotational stop limiting rotation of the latch relative to the housing toward the latching position and a second rotational stop limiting rotation of the latch relative to the housing toward the unlatching position. In some embodiments, the first and second rotational stops limit rotation of the latch relative to the housing to no more than 45 degrees.

A toner cartridge for use with an imaging unit in an electrophotographic image forming device according to another example embodiment includes a housing having a top, a bottom, a front and a rear positioned between a first side and a second side of the housing. The housing has a reservoir for holding toner. An outlet in fluid communication with the reservoir is positioned on the front of the housing for exiting toner from the housing. A latch is positioned on the rear of the housing. The latch is rotatable relative to the housing between a latching position for latching the toner cartridge to the imaging unit and an unlatching position for permitting the toner cartridge to separate from the imaging unit. The latch is rotatable about a rotational axis that extends along a front-to-rear dimension of the housing. The latch includes a contact surface that faces upward toward the top of the housing when the latch is in the latching position for contacting a downward facing surface of a corresponding latch catch on the imaging unit in order to prevent the toner cartridge from lifting off of the imaging unit when the toner cartridge is mated with the imaging unit and the latch is in the latching position.

BRIEF DESCRIPTION OF THE DRAWINGS

The accompanying drawings incorporated in and forming a part of the specification illustrate several aspects of the present disclosure and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
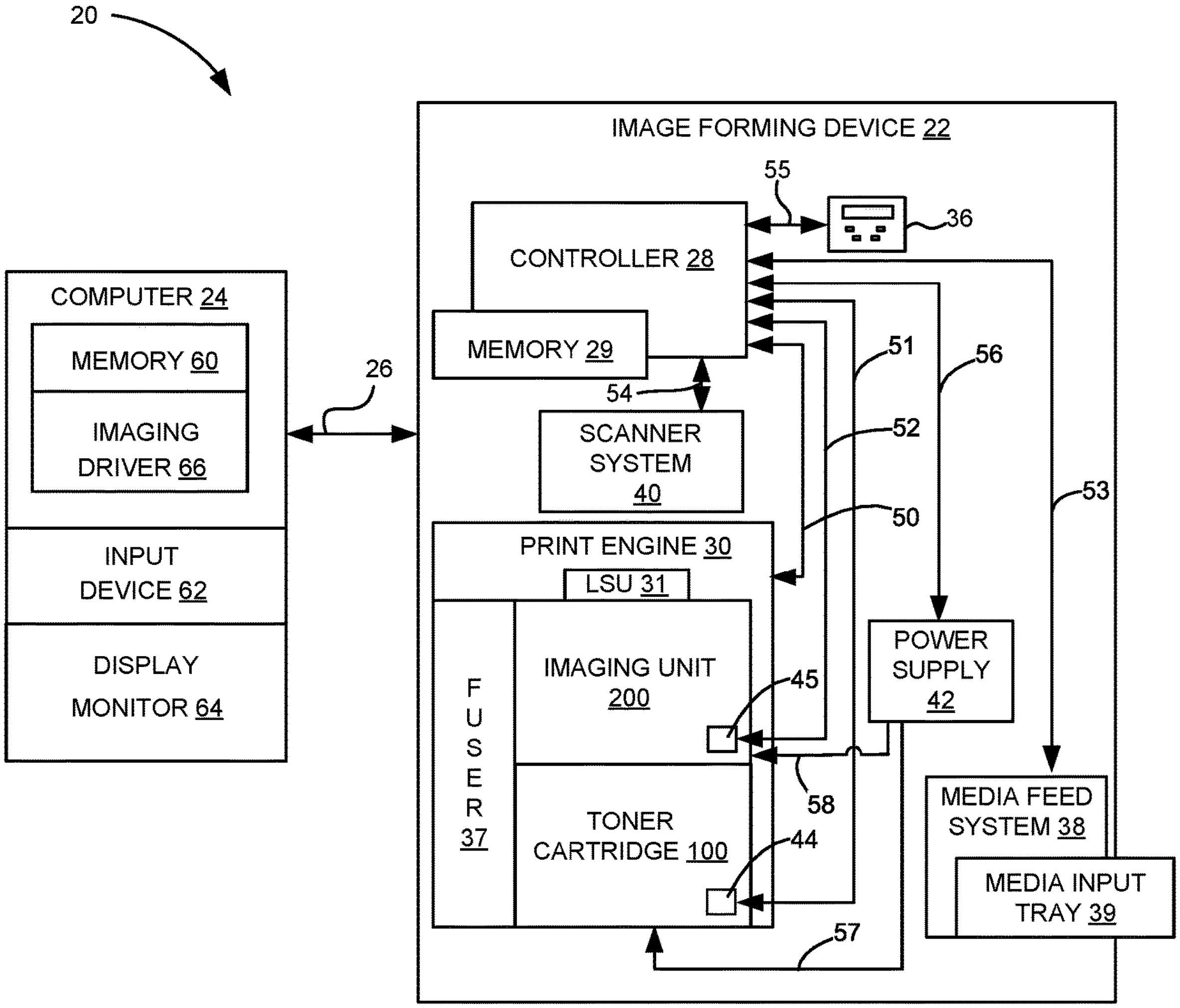
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24, Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (MO) device) that includes a controller 28, a print engine 30, a laser scan unit (LSU) 31, a toner cartridge 100, an imaging unit 200, a user interface 36, a media feed system 38, a media input tray 39, a scanner system 40 and a power supply 42. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor unit may include one or more integrated circuits in the form of a microprocessor or central processing unit and may include one or more Application-Specific integrated Circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with toner cartridge 100 and processing circuitry 44 thereon via a communications link 51. Controller 28 communicates with imaging unit 200 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 communicates with power supply 42 via a communications link 56. Controller 28 processes print and scan data and operates print engine 30 during printing and scanner system 40 during scanning. Processing circuitry 44, 45 may provide authentication functions, safety and operational interlocks, operating parameters and usage information related to toner cartridge 100 and imaging unit 200, respectively. Each of processing circuitry 44, 45 includes a processor unit to and associated electronic memory. As discussed above, the processor may include one or more integrated circuits in the form of a microprocessor or central processing unit and/or may include one or more Application-Specific Integrated Circuits (ASICs), The memory may be any volatile and/or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100, imaging unit 200 and a fuser 37, all mounted within image forming device 22. Toner cartridge 100 and imaging unit 200 are removably mounted in image forming device 22. Power supply 42 provides an electrical voltage to various components of toner cartridge 100 and imaging unit 200 via respective electrical paths 57 and 58. In one embodiment, toner cartridge 100 includes a developer unit that houses a toner reservoir and a toner development system. In one embodiment, the toner development system utilizes what is commonly referred to as a single component development system. In this embodiment, the toner development system includes a toner adder roll that provides toner from the toner reservoir to a developer roll. A doctor blade provides a metered, uniform layer of toner on the surface of the developer roll. In another embodiment, the toner development system utilizes what is commonly referred to as a dual component development system. In this embodiment, toner in the toner reservoir of the developer unit is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, the developer unit includes a developer roll that attracts the magnetic carrier beads having toner thereon to the developer roll through the use of magnetic fields. In one embodiment, imaging unit 200 includes a photoconductor unit that houses a charge roll, a photoconductive drum and a waste toner removal system. Although the example image forming device 22 illustrated in FIG. 1 includes one toner cartridge and one imaging unit, in the case of an image forming device configured to print in color, separate toner cartridges and imaging units may be used for each toner color. For example, in one embodiment, the image forming device includes four toner cartridges, each containing a particular toner color (e.g., black, cyan, yellow and magenta) to permit color printing, and four corresponding imaging units.

The electrophotographic printing process is well known in the art and, therefore, is described briefly herein. During a printing operation, laser scan unit 31 creates a latent image on the photoconductive drum in imaging unit 200, Toner is transferred from the toner reservoir in toner cartridge 100 to the latent image on the photoconductive drum by the developer roll to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
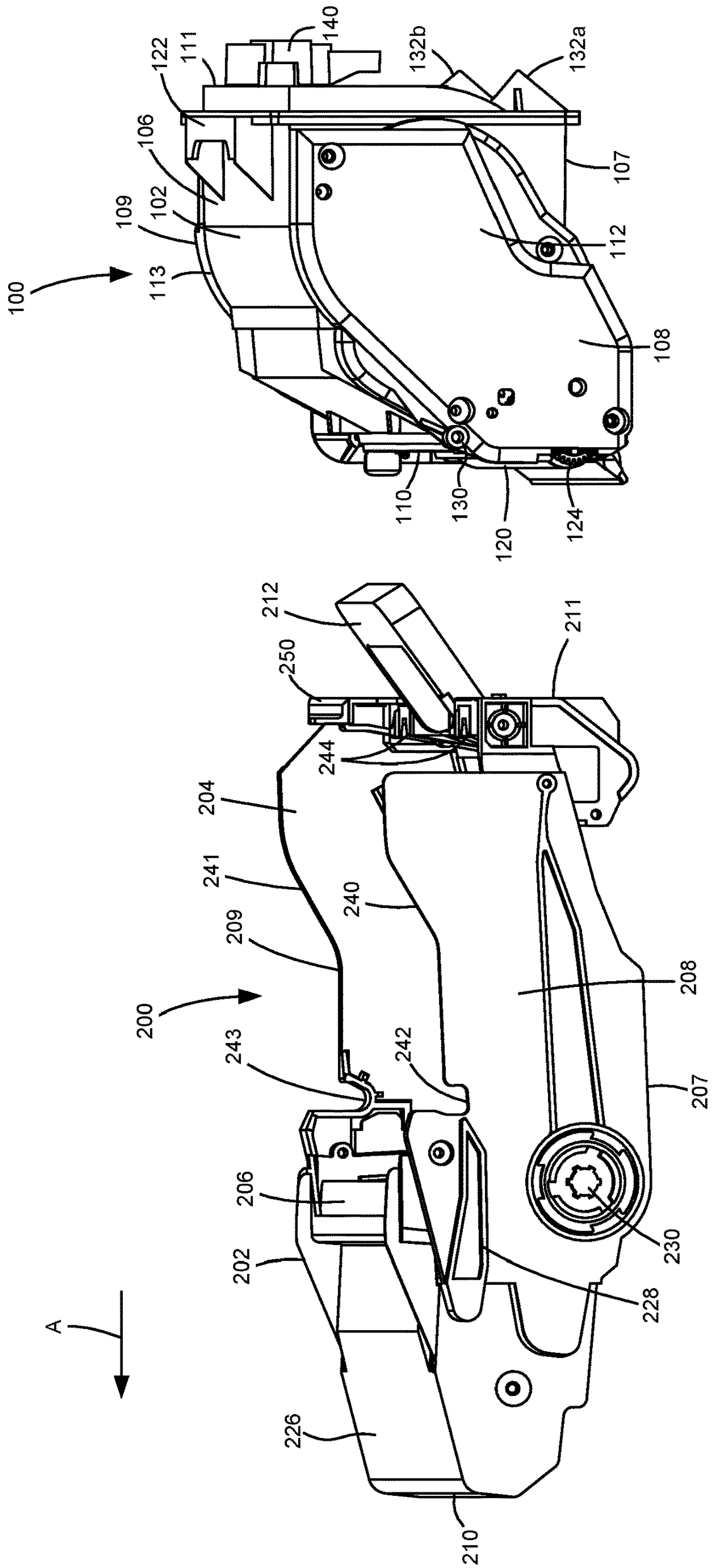
FIG. 2 is a perspective view of a toner cartridge and an imaging unit separated from each other according to one example embodiment.
Figure 3:
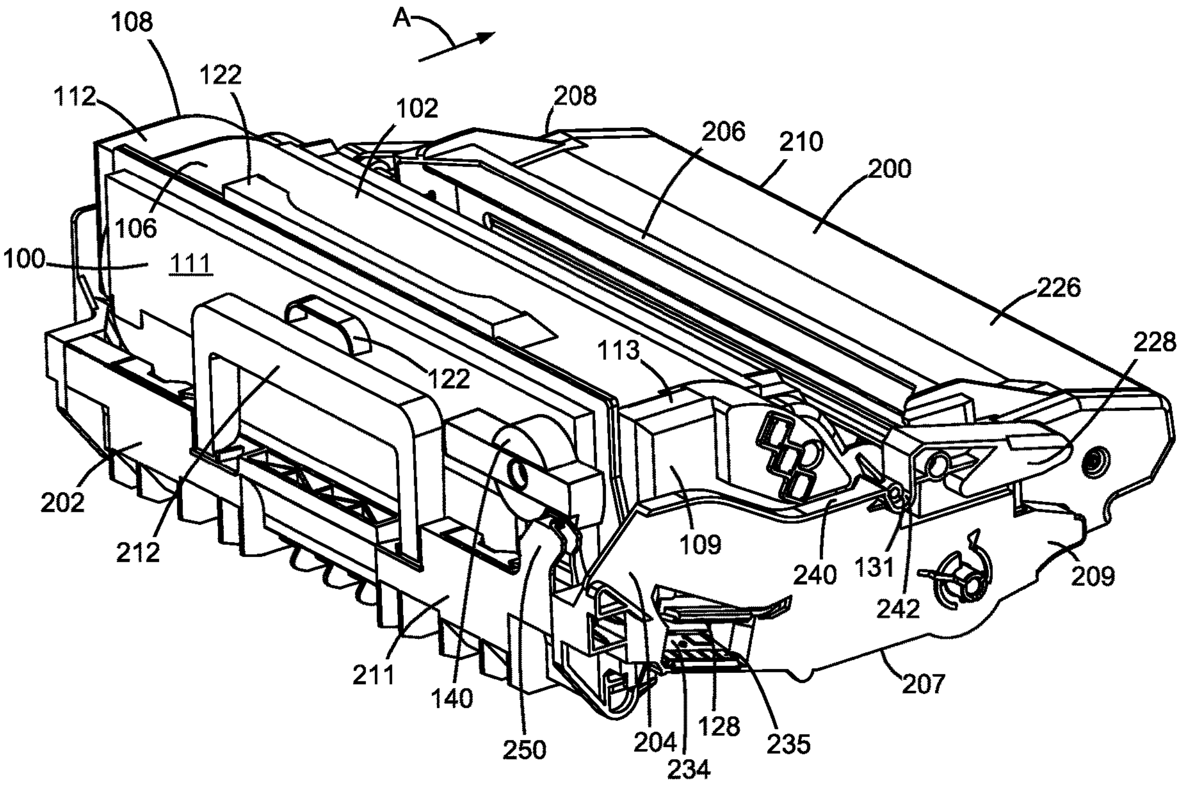
FIG. 3 is a perspective view of the toner cartridge and the imaging unit shown in FIG. 2 mated with each other according to one example embodiment.
Figure 4:
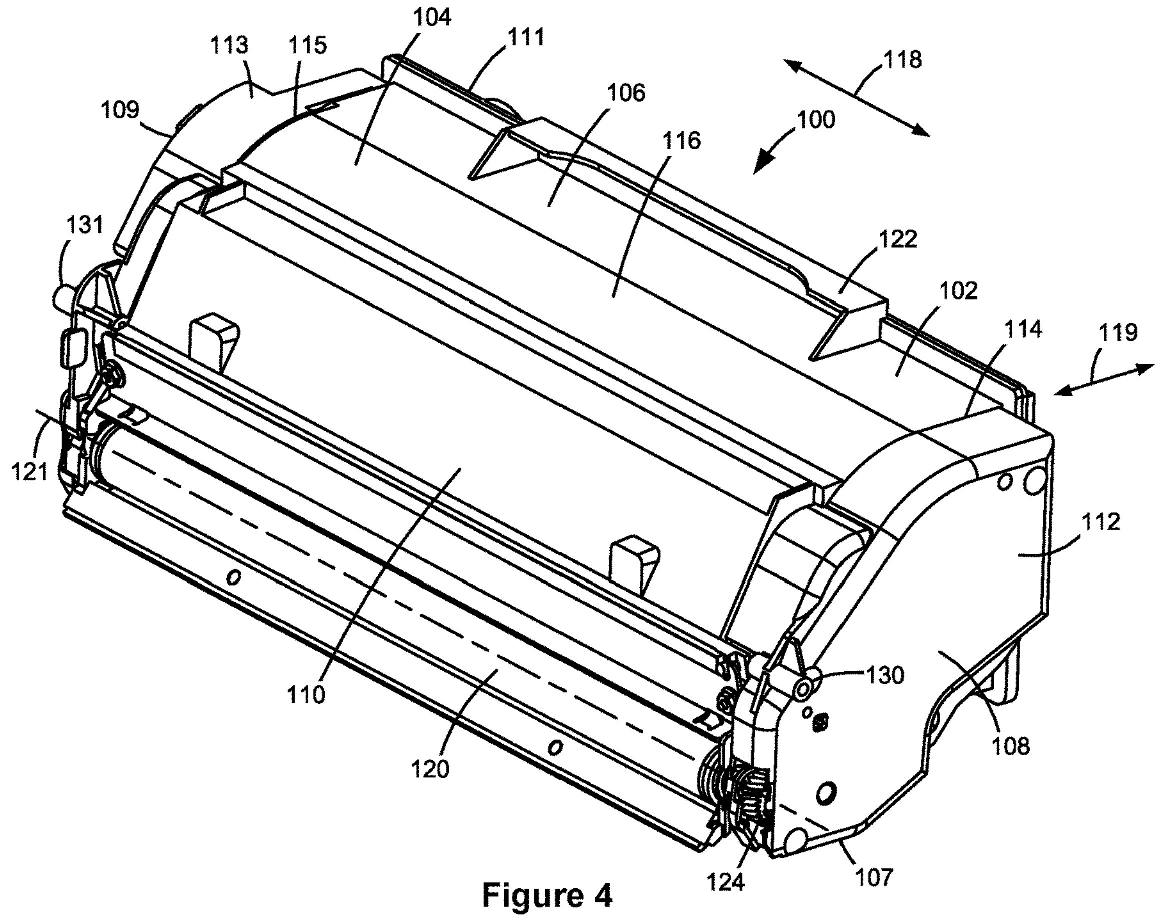
FIG. 4 is a front perspective view of the toner cartridge shown in FIGS. 2 and 3.
Figure 5:
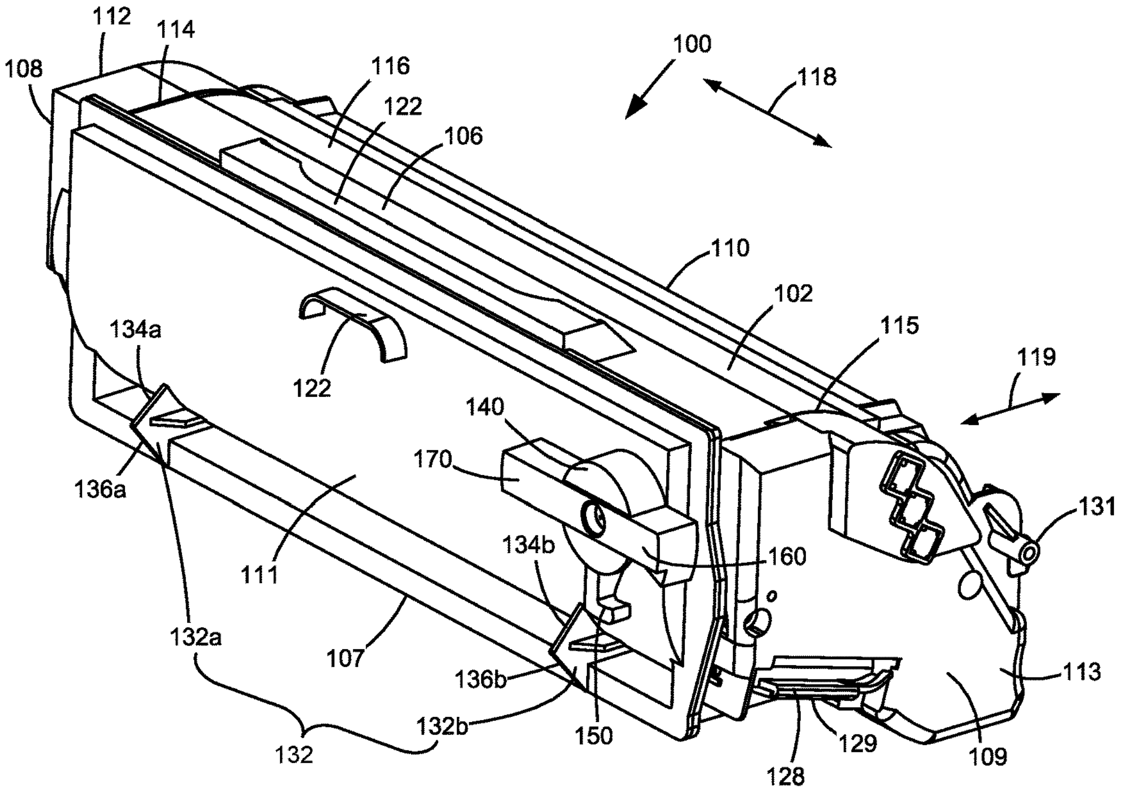
FIG. 5 is a rear perspective view of the toner cartridge shown in FIGS. 2-4.

Referring now to FIGS. 2 and 3, toner cartridge 100 and imaging unit 200 are shown according to one example embodiment. As discussed above, toner cartridge 100 and imaging unit 200 are each removably installed in image forming device 22. Toner cartridge 100 is first installed on a frame 204 of imaging unit 200 and mated with imaging unit 200. Toner cartridge 100 and imaging unit 200 are then slidably inserted together into image forming device 22. FIG. 2 shows toner cartridge 100 and imaging unit 200 separated from each other and FIG. 3 shows toner cartridge 100 installed on imaging unit 200. The arrow A shown in FIGS. 2 and 3 indicates the direction of insertion of toner cartridge 100 and imaging unit 200 into image forming device 22. This arrangement allows toner cartridge 100 and imaging unit 200 to be easily removed from and reinstalled in image forming device 22 as a single unit, while permitting toner cartridge 100 and imaging unit 200 to be repaired or replaced separately from each other.

Figure 7:
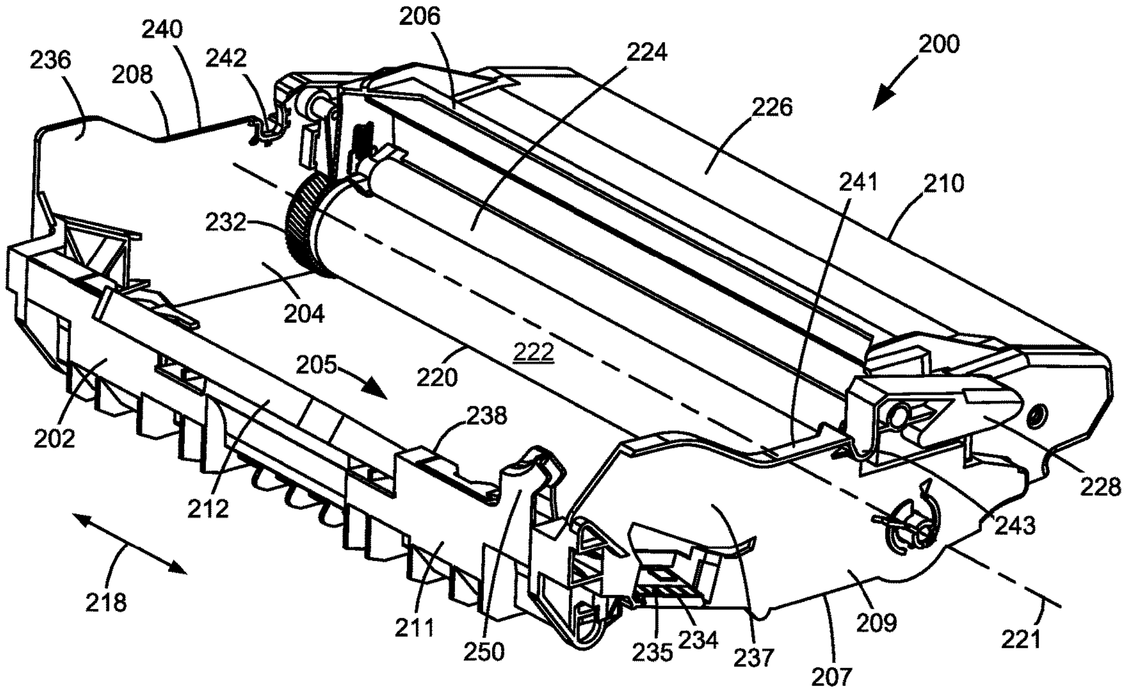
FIG. 7 is a rear perspective view of the imaging unit shown in FIGS. 2 and 3.
Figure 8:
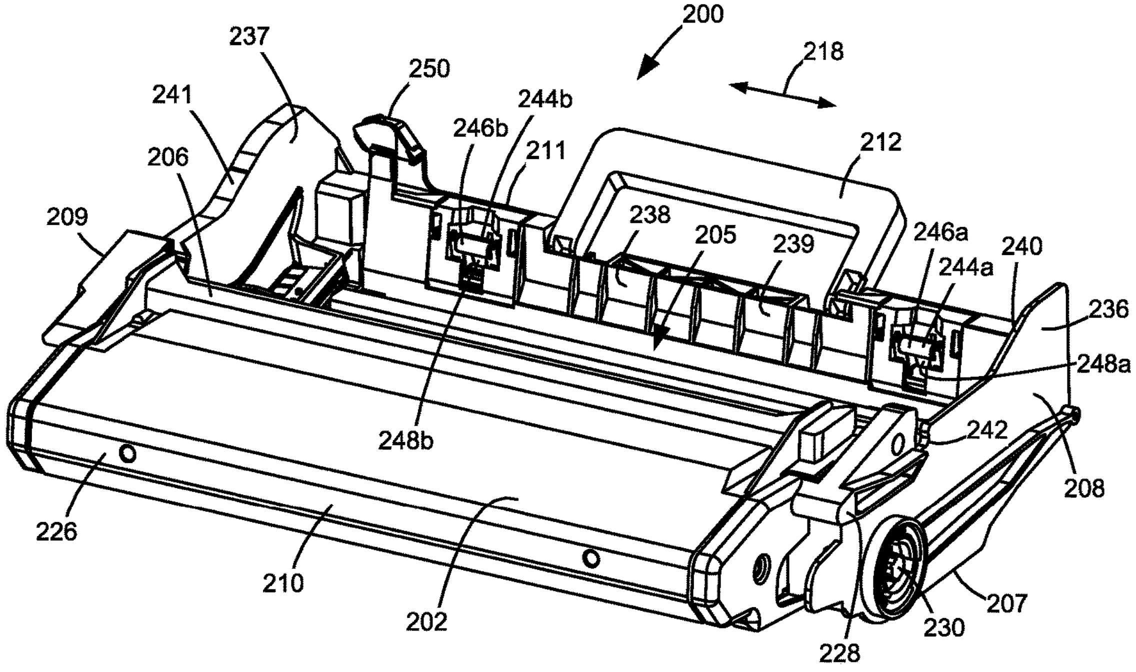
FIG. 8 is a front perspective view of the imaging unit shown in FIGS. 2, 3 and 7.

With reference to FIGS. 2-5, toner cartridge 100 includes a housing 102 having an enclosed reservoir 104 for storing toner. Housing 102 includes a top 106, a bottom 107, first and second sides 108, 109, a front 110 and a rear 111. Front 110 of housing 102 leads during insertion of toner cartridge 100 into image forming device 22, and rear 111 trails. In one embodiment, each side 108, 109 of housing 102 includes an end cap 112, 113 mounted, e.g., by fasteners or a snap-fit engagement, to side walls 114, 115 of a main body 116 of housing 102. In the example embodiment illustrated, toner cartridge 100 includes a rotatable developer roll 120 having a rotational axis 121 that runs along a side-to-side dimension 118 of housing 102, from side 108 to side 109. A portion of developer roll 120 is exposed from housing 102 along front 110 of housing 102, near bottom 107 of housing 102 for delivering toner from toner cartridge 100 to a corresponding photoconductive drum 220 (FIG. 7) of imaging unit 200. In this manner, developer roll 120 forms an outlet for exiting toner from toner cartridge 100. A handle 122 may be provided on top 106 and/or rear 111 of housing 102 to assist with coupling and decoupling toner cartridge 100 to and from imaging unit 200 and insertion and removal of toner cartridge 100 and imaging unit 200 into and out of image forming device 22.

Toner cartridge 100 also includes an interface gear 124 positioned on side 108 of housing 102. In the embodiment illustrated, interface gear 124 mates with and receives rotational force from a corresponding drive gear on imaging unit 200 in order to provide rotational force to developer roll 120 and other rotatable components of toner cartridge 100 for to moving toner to developer roll 120 when toner cartridge 100 is installed in image forming device 22. In the embodiment illustrated, interface gear 124 is mounted to a shaft of developer roll 120, coaxial with developer roll 120. In this embodiment, a front portion of interface gear 124 is exposed on the front 110 of housing 102, near bottom 107 of housing 102 and is unobstructed to mate with and receive rotational force from the corresponding drive gear on imaging unit 200. In the embodiment illustrated, interface gear 124 is rotatably connected to a drive train that is positioned between end cap 112 and side wall 114 of housing 102. The drive train aids in transferring rotational force from interface gear 124 to rotatable components of toner cartridge 100, including, for example, to a toner adder roll that provides toner from reservoir 104 to developer roll 120 and to one or more toner agitators that move toner in reservoir 104 toward the toner adder roll and that agitate and mix the toner in reservoir 104. In the example embodiment illustrated, interface gear 124 is formed as a helical gear, but other configurations may be used as desired.

In the embodiment illustrated, toner cartridge 100 also includes an electrical connector 128 positioned on side 109 of housing 102 that includes one or more electrical contacts 129 that mate with corresponding electrical contacts in image forming device 22 when toner cartridge 100 is installed in image forming device 22 in order to facilitate communications link 51 between controller 28 of image forming device 22 and processing circuitry 44 of toner cartridge 100.

Toner cartridge 100 also includes an alignment guide 130, 131 extending outward from each side 108, 109 of housing 102. Alignment guides 130, 131 assist with mating toner cartridge 100 to imaging unit 200 and with positioning toner cartridge 100 relative to imaging unit 200 during operation in image forming device 22. Alignment guides 130, 131 are received by corresponding guides on imaging unit 200 that aid in positioning toner cartridge 100 relative to imaging unit 200. Alignment guides 130, 131 are spaced above developer roll 120 along front 110 of housing 102, e.g., at the same height as each other and at the same position along a front-to-rear dimension of housing 102.

Toner cartridge 100 also includes one or more engagement members 132 that receive a bias force from corresponding hold-downs on imaging unit 200 to retain toner cartridge 100 in its operative position on imaging unit 200 during operation. For example, the bias force to received by engagement members 132 maintains contact between developer roll 120 and the corresponding photoconductive drum 220 on imaging unit 200 and between interface gear 124 and the corresponding drive gear on imaging unit 200.

In the example embodiment illustrated, engagement members 132 are positioned on rear 111 of housing 102, near bottom 107 of housing 102. The example embodiment illustrated includes a pair of engagement members **132*a*, 132*b*. In the embodiment illustrated, engagement member 132*a* is positioned closer to side 108 than to side 109, and engagement member 132*b* is positioned closer to side 109 than to side 108. In the embodiment illustrated, each engagement member 132*a*, 132*b* is formed as a projection from rear 111 of housing 102, e.g., a substantially vertical fin or wing extending from rear 111 of housing 102. Each engagement member 132*a*, 132*b* includes a contact surface 134*a*, 134*b* that contacts the corresponding hold-down on imaging unit 200 when toner cartridge 100** is installed on imaging unit

200, Contact surfaces 134*a*, 134*b* are angled upward such that each contact surface 134*a*, 134*b* faces upwards and rearwards relative to housing 102, i.e., in a direction toward the top 106 of housing 102 and away, from the rear 111 of housing 102 as illustrated. Each engagement member 132*a*, 132*h* may also include an angled lead-in surface 136*a*, 136*b* that facilitates engagement between engagement members 132*a*, 132*b* and the corresponding hold-downs on imaging unit 200. Lead-in surfaces 136*a*, 136*h* are angled downward such that each lead-in surface 136*a*, 136*b* faces downwards and rearwards relative to housing 102, i.e., in a direction toward the bottom 107 of housing 102 and away from the rear 111 of housing 102 as illustrated.

Figure 6A:
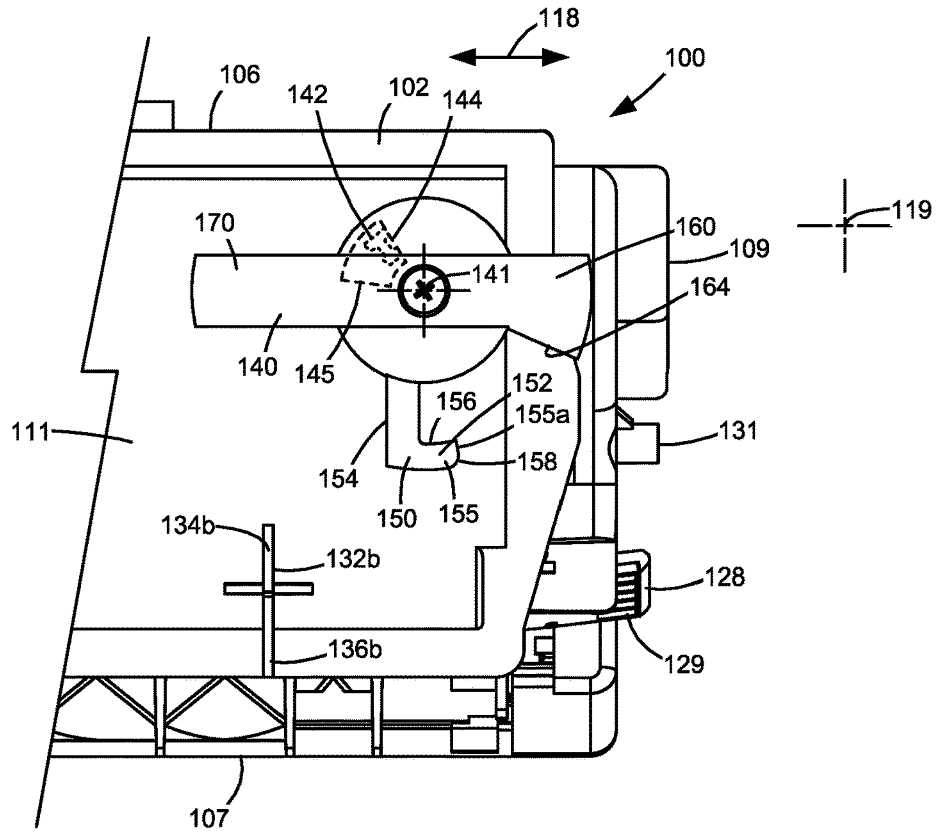
FIG. 6A is a rear elevation view of the toner cartridge showing a latch of the toner cartridge in a latching position according to one example embodiment.
Figure 6B:
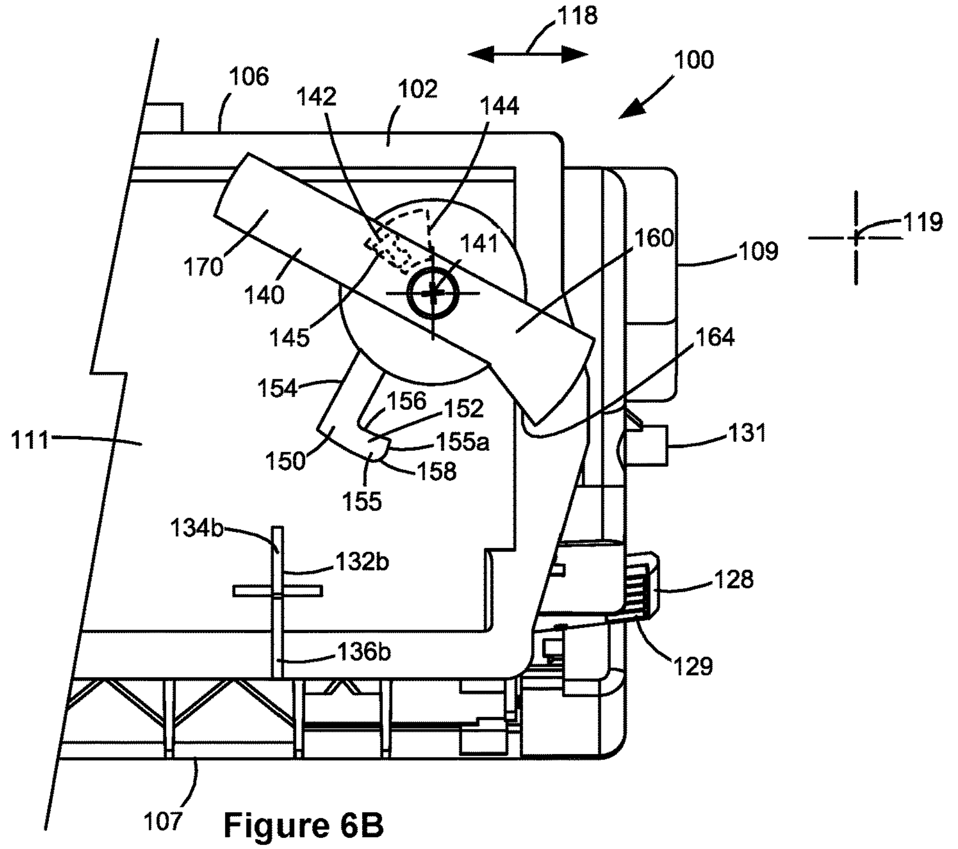
FIG. 6B is a rear elevation view of the toner cartridge showing the latch of the toner cartridge in an unlatching position according to one example embodiment.

With reference to FIGS. 6A and 6B, toner cartridge 100 includes a latch 140 that selectably fixes toner cartridge 100 to imaging unit 200 when toner cartridge 100 is installed on imaging unit 200 in order to permit a user to install toner cartridge 100 and imaging unit 200 in image forming device 22 as a single unit and to remove toner cartridge 100 and imaging unit 200 from image forming device 22 as a single unit. Latch 140 is movable, e.g., by manual user actuation, between a latching position that fixes toner cartridge 100 to imaging unit 200 and an unlatching position that permits separation of toner cartridge 100 from imaging unit 200. Separating toner cartridge 100 from imaging unit 200 allows a user to independently repair or replace toner cartridge 100 or imaging unit 200.

FIG. 6A shows latch 140 in the latching position according to one example embodiment. FIG. 6B shows latch 140 in the unlatching position according to the same embodiment. In the example embodiment illustrated, latch 140 is positioned on rear 111 of housing 102. In other embodiments, latch 140 may be positioned in other suitable locations on toner cartridge 100 as desired to engage a corresponding latch catch on imaging unit 200. In the example embodiment illustrated, latch 140 is rotatable about a rotational axis 141 between the latching position shown in FIG. 6A and the unlatching position shown in FIG. 6B. In this embodiment, rotational axis 141 extends along a front-to-rear dimension 119 of housing 102. In other embodiments, latch 140 may move along other suitable paths, including, e.g., translation, between the latching position and the unlatching position.

Rotational stops limit the rotation of latch 140 relative to housing 102 between the latching position and the unlatching position. For example, in the embodiment illustrated, a post 142 on rear 111 of housing 102 is positioned between a pair of rotational stops 144, 145 on an inner face of latch 140 that faces toward rear 111 of housing 102. Of course, this configuration may be reversed as desired. The positions of post 142 and rotational stops 144, 145 are shown in dashed lines in FIGS. 6A and 6B since post 142 and rotational stops 144, 145 are obscured behind latch 140 in this view. FIG. 6A shows post 142 in contact with rotational stop 144 preventing further counterclockwise rotation as viewed in FIG. 6A of latch 140 relative to housing 102. FIG. 6B shows post 142 in contact with rotational stop 145 preventing further clockwise rotation as viewed in FIG. 6B of latch 140 relative to housing 102. In the example embodiment illustrated, post 142 is generally I-shaped for added rigidity to reduce damage to post 142 in the event that a user rotates latch 140 in an overly forceful manner. In some embodiments, rotational stops 144, 145 limit rotation of latch 140 relative to housing 102 to no more than 90 degrees, including no more than 45 degrees, such as 29 degrees in the example embodiment illustrated.

Latch 140 includes a locking member (or locking extension) 150 positioned to contact the corresponding latch catch on imaging unit 200 in order to prevent toner cartridge 100 from separating from imaging unit 200 when latch 140 is in the latching position. In the embodiment illustrated, locking member 150 includes a hook 152. Hook 152 includes a first segment 154 that extends generally radially away from rotational axis 141 of latch 140 and a second segment 155 that extends generally circumferentially relative to rotational axis 141 of latch 140, In this embodiment, hook 152 is generally L-shaped; however, hook 152 may, for example, include more pronounced curvature providing a more rounded (e.g., C-shaped) hook as desired. In other embodiments, hook 152 may be formed from two or more linear segments forming, for example, an L-shaped or C-shaped hook. Hook 152 includes an inner contact surface 156 that faces generally toward rotational axis 141 of latch 140. Inner contact surface 156 of hook 152 is positioned to contact a corresponding surface of the latch catch on imaging unit 200 in order to prevent toner cartridge 100 from separating from imaging unit 200 when latch 140 is in the latching position. In the embodiment illustrated, inner contact surface 156 is positioned along an inner surface of second segment 155. In some embodiments, locking member 150 also includes a cam follower surface 158 that helps hook 152 clear the corresponding latch catch on imaging unit 200 during installation of toner cartridge 100 onto imaging unit 200 as discussed in greater detail below. In the embodiment illustrated, cam follower surface 158 is positioned at a distal end 155*a* of second segment 155 relative to first segment 154.

Latch 140 also includes a camming extension 160 positioned to contact one or more camming surfaces of the corresponding latch catch on imaging unit 200 to help hook 152 clear the latch catch during installation of toner cartridge 100 onto imaging unit 200 and to aid in separating toner cartridge 100 from imaging unit 200 when the user actuates latch 140 from the latching position to the unlatching position. In the embodiment illustrated, camming extension 160 extends generally radially away from rotational axis 141 of latch 140. Camming extension 160 is spaced angularly relative to rotational axis 141 of latch 140 from hook 152, proximate to inner contact surface 156 of hook 152. That is, ramming extension 160 is positioned angularly closer to distal end 155*a* of second segment 155 of hook 152 than to first segment 154 of hook 152. Caroming extension 160 includes a cam follower surface 162 that is positioned to contact one or more camming surfaces of the corresponding latch catch on imaging unit 200 as discussed in greater detail below. In the embodiment illustrated, cam follower surface 162 is formed along an angled surface 164 of camming extension 160 that extends angularly toward hook 152 as angled surface 164 extends radially outward.

Latch 140 also includes a handle 170 that allows a user to manually rotate latch 140 from the latching position to the unlatching position in order to separate toner cartridge 100 from imaging unit 200. In the embodiment illustrated, handle 170 extends generally radially away from rotational axis 141 of latch 140. In this embodiment, handle 170 extends from rotational axis 141 in a direction opposite camming extension 160 with hook 152 positioned angularly between camming extension 160 and handle 170.

In the example embodiment illustrated, latch 140 is positioned closer to side 109 of housing 102 than to side 108 of housing 102. In this embodiment, camming extension 160 extends generally toward side 109 of housing 102, and handle 170 extends generally toward side 108 of housing 102; however, this arrangement may be reversed as desired.

In this embodiment, second segment 155 of hook 152 extends generally toward side 109 of housing 102, but this configuration may be reversed as desired, particularly if camming extension 160 extends toward side 108 of housing 102 instead of toward side 109. In the embodiment illustrated, hook 152 is spaced generally equidistant from camming extension 160 and handle 170, e.g., about 90 degrees from each. However, the positioning of and spacing between hook 152, camming extension 160 and handle 170 may be adjusted as desired.

With reference to FIGS. 2, 3, 7 and 8, imaging unit 200 includes a housing 202 including a top 206, a bottom 207, first and second sides 208, 209, a front 210 and a rear 211. Front 210 of housing 202 leads during insertion of imaging unit 200 into image forming device 22, and rear 211 trails. In the embodiment illustrated, frame 204 includes a toner cartridge receiving area 205 positioned at rear 211 of housing 202. A handle 212 may be provided on rear 211 of housing 202, e.g., on frame 204, to assist with insertion and removal of toner cartridge 100 and imaging unit 200 into and out of image forming device 22.

In the example embodiment illustrated, imaging unit 200 includes a rotatable photoconductive drum 220 having a rotational axis 221 that runs along a side-to-side dimension 218 of housing 202, from side 208 to side 209. A rear portion of photoconductive drum 220 is open to toner cartridge receiving area 205 of frame 204 for receiving toner from developer roll 120 of toner cartridge 100. A bottom portion of photoconductive drum 220 is exposed from housing 202 on bottom 207 of housing 202. Toner on an outer surface 222 of photoconductive drum 220 is transferred from the bottom portion of outer surface 222 of photoconductive drum 220 to a media sheet or intermediate transfer member during a print operation. Imaging unit 200 also includes a rotatable charge roll 224 in contact with outer surface 222 of photoconductive drum 220 that charges outer surface 222 of photoconductive drum 220 to a predetermined voltage. Imaging unit 200 also includes a waste toner removal system that may include a cleaner blade or roll that removes residual toner from outer surface 222 of photoconductive drum 220. In the example embodiment illustrated, imaging unit 200 includes a waste toner reservoir 226 positioned at the front 210 of housing 202. Waste toner reservoir 226 stores toner removed from photoconductive drum 220 by the cleaner blade or roll.

Sides 208, 209 may each include one or more alignment guides 228 that extend outward from the respective side 208, 209 to assist with insertion and removal of toner cartridge 100 and imaging unit 200 into and out of image forming device 22. Alignment guides 228 are received by corresponding guide rails in image forming device 22 that aid in positioning toner cartridge 100 and imaging unit 200 relative to image forming device 22.

Imaging unit 200 also includes a drive coupler 230 positioned on side 208 of housing 202. Drive coupler 230 mates with and receives rotational force from a corresponding drive coupler in image forming device 22 in order to provide rotational force to photoconductive drum 220 when imaging unit 200 is installed in image forming device 22. In the embodiment illustrated, drive coupler 230 is positioned at an axial end of photoconductive drum 220, coaxial with photoconductive drum 220. In this embodiment, an outer axial end of drive coupler 230 is exposed on side 208 of housing 202 and is unobstructed to mate with and receive rotational force from the corresponding drive coupler in image forming device 22. In the example embodiment illustrated, drive coupler 230 is configured to receive rotational force at the outer axial end of drive coupler 230, but other configurations may be used as desired. In some embodiments, charge roll 224 is driven by friction contact between the surfaces of charge roll 224 and photoconductive drum 220. In other embodiments, charge roll 224 is connected to drive coupler 230 by one or more gears.

In the embodiment illustrated, imaging unit 200 also includes a drive gear 232 attached to photoconductive drum 220, axially inboard of drive coupler 230. A portion of drive gear 232 is exposed to toner cartridge receiving area 205 of frame 204 permitting interface gear 124 of toner cartridge 100 to mate with drive gear 232 of imaging unit 200 when toner cartridge 100 is installed on frame 204 of imaging unit 200 to permit the transfer of rotational force received by drive coupler 230 of imaging unit 200 to interface gear 124 of toner cartridge 100 by way of drive gear 232 of imaging unit 200.

Imaging unit 200 also includes an electrical connector 234 positioned on a portion of frame 204 on side 209 of housing 202 that includes one or more electrical contacts 235 that mate with corresponding electrical contacts in image forming device 22 when imaging unit 200 is installed in image forming device 22 in order to facilitate communications link 52 between controller 28 of image forming device 22 and processing circuitry 45 of imaging unit 200.

Frame 204 of imaging unit 200 includes opposed side walls 236, 237 positioned at sides 208, 209 of housing 202, respectively, and a rear wall 238 positioned at rear 211 of housing 202. Side walls 236, 237 and rear wall 238 define toner cartridge receiving area 205 of frame 204. In the embodiment illustrated, a guide rail 240, 241 is positioned along a top surface of each side wall 236, 237. Guide rails 240, 241 receive alignment guides 130, 131 of toner cartridge 100 during installation of toner cartridge 100 onto imaging unit 200 and aid in guiding toner cartridge 100 to toner cartridge receiving area 205 of imaging unit 200 including guiding developer roll 120 toward photoconductive drum 220.

An alignment guide 242, 243 is positioned along a top surface of each side wall 236, 237 at a front portion of frame 204. Alignment guides 242, 243 contact corresponding alignment guides 130, 131 of toner cartridge 100 when toner cartridge 100 is fully installed on imaging unit 200 in order to position toner cartridge 100 relative to imaging unit 200. In the embodiment illustrated, alignment guides 242, 243 are positioned at the front of guide rails 240, 241. In this embodiment, alignment guides 242, 243 are formed as dwells or depressions that extend downward from guide rails 240, 241.

Frame 204 of imaging unit 200 includes at least one hold-down 244 that contacts and applies a bias force to the engagement member(s) 132 of toner cartridge 100. Hold-downs 244 are positioned at a rear portion of frame 204, such as on an inner side 239 of rear wall 238 of frame 204. The example embodiment illustrated includes a pair of hold-downs 244*a*, 244*b* corresponding to the pair of engagement members 132*a*, 132*b* of toner cartridge 100. In the embodiment illustrated, hold-down 244*a* is positioned closer to side 208 than to side 209 of imaging unit 200, and hold-down 244*b* is positioned closer to side 209 than to side 208 of imaging unit 200. Hold-downs 244*a*, 244*b* are resiliently deflectable relative to frame 204 in order to supply a bias force to corresponding contact surfaces 134*a*, 134*b* of engagement to members 132*a*, 132*b* of toner cartridge 100 that is normal to contact surfaces 134*a*, 134*b*. In the embodiment illustrated, each hold-down 244*a*, 244*b* includes a rod 246*a*, 246*b* that is pivotally, mounted to rear wall 238 of frame 204 and that is horizontally oriented.

However, hold-downs 244*a*, 244*b* may take other suitable shapes and configurations and may be mounted in other orientations as desired. In the embodiment illustrated, each hold-down 244*a*, 244*b* is biased toward photoconductive drum 220 and front 210 of housing 202 by a corresponding spring 248*a*, 248*b* on frame 204.

Imaging unit 200 includes a latch catch 250 that engages latch 140 on toner cartridge 100 when toner cartridge 100 is installed on imaging unit 200 and latch 140 is in the latching position in order to prevent toner cartridge 100 from separating from imaging unit 200. In the embodiment illustrated, latch catch 250 extends upward from a top portion of rear wall 238 of frame 204.

Figure 9:
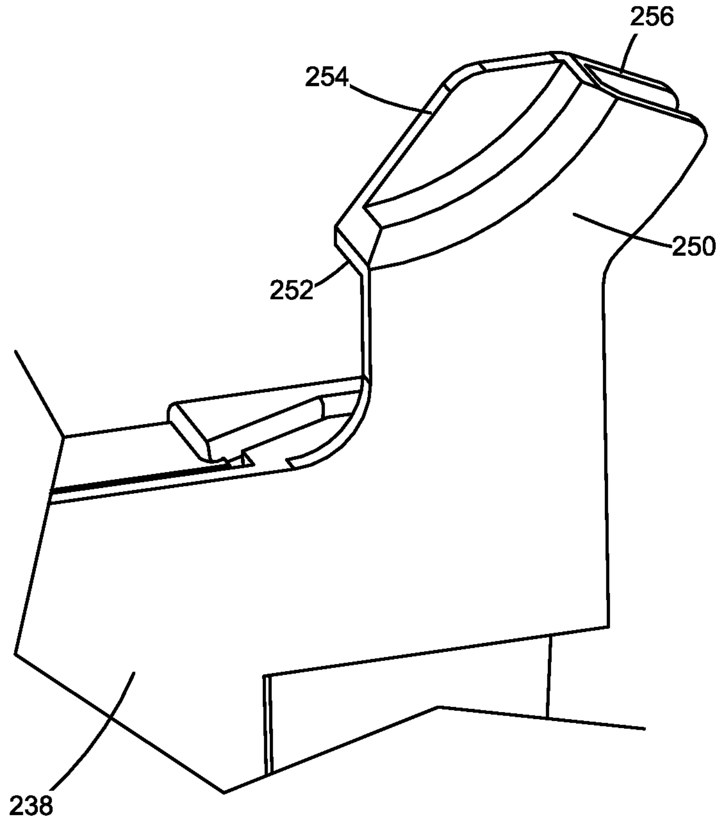
FIG. 9 is a perspective view of a latch catch of the imaging unit according to one example embodiment.

FIG. 9 shows latch catch 250 in greater detail according to one example embodiment. Latch catch 250 includes a downward facing latching contact surface 252 that is positioned to contact inner contact surface 156 of hook 152 of latch 140 if toner cartridge 100 is lifted upward relative to imaging unit 200 when toner cartridge 100 is installed on imaging unit 200 and latch 140 is in the latching position in order to prevent separation of toner cartridge 100 from imaging unit 200. Latch catch 250 also includes a pair of camming surfaces 254, 256 that are positioned to contact cam follower surfaces 158, 162 of latch 140 of toner cartridge 100 during insertion of toner cartridge 100 onto imaging unit 200 in order to help hook 152 of latch 140 clear latch catch 250 as discussed in greater detail below. In the embodiment illustrated, camming surface 254 angles downward and toward side 208 of housing 202, and camming surface 256 angles downward and toward side 209 of housing 202.

Figure 10:
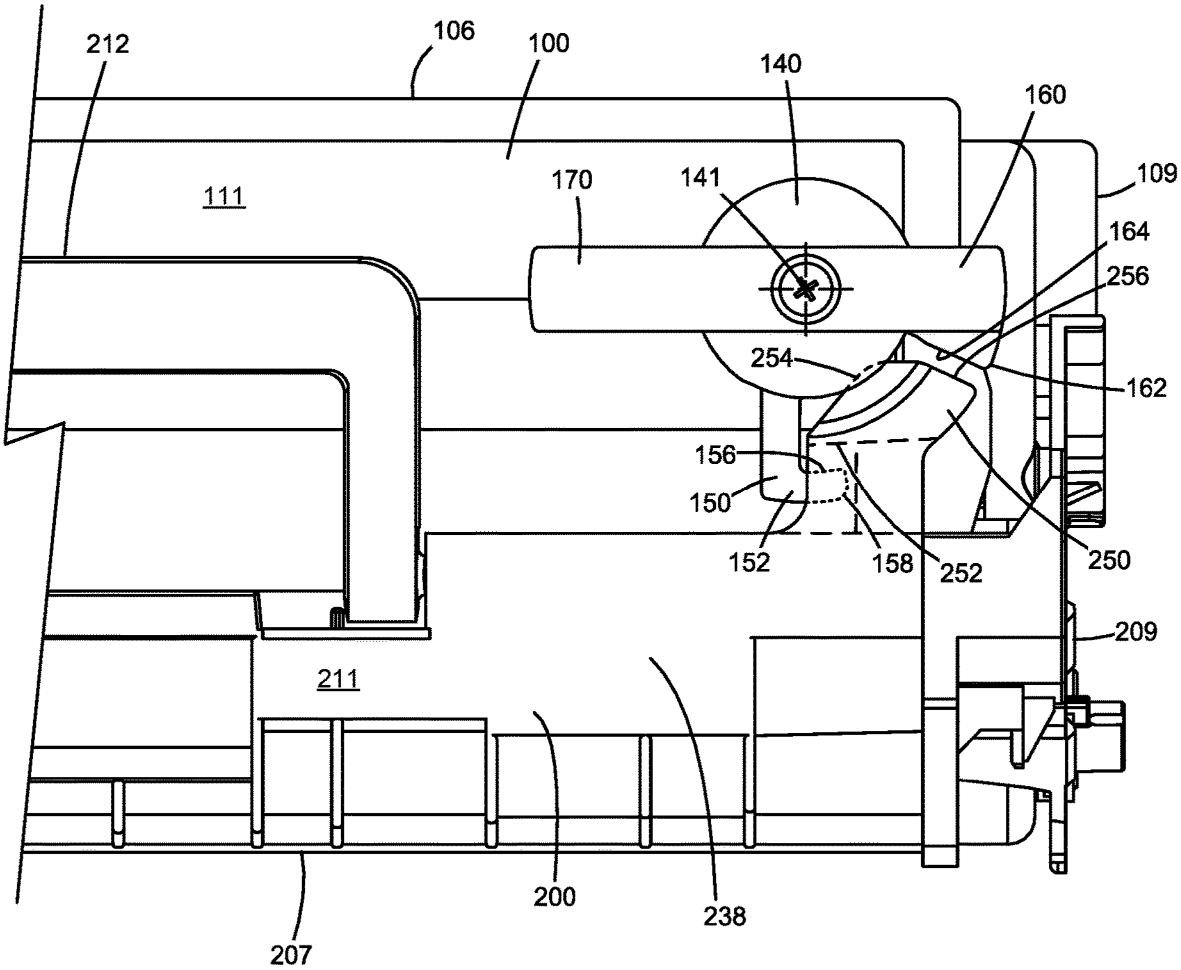
FIG. 10 is a rear elevation view of the toner cartridge installed on the imaging unit with the latch of the toner cartridge in the latching position according to one example embodiment.

FIG. 10 shows toner cartridge 100 installed on imaging unit 200 with latch 140 in the latching position relative to latch catch 250, Portions of latch 140 obscured by latch catch 250 and portions of latch catch 250 obscured by latch 140 are shown in dashed lines. In this embodiment, hook 152 of latch 150 is positioned directly below latching contact surface 252 such that if rear 111 of toner cartridge 100 is lifted relative to imaging unit 200, such as during handling of toner cartridge 100 and imaging unit 200 by a user, inner contact surface 156 of hook 152 contacts latching contact surface 252 of latch catch 250 thereby preventing rear 111 of toner cartridge 100 from further upward movement relative to imaging unit 200. In this embodiment, toner cartridge 100 is otherwise restrained within toner cartridge receiving area 205 of imaging unit 200 in a manner that, for example, prevents front 110 of toner cartridge 100 from separating from imaging unit 200 prior to rear 111 of toner cartridge 100 rising and separating from imaging unit 200. Toner cartridge receiving area 205 also prevents toner cartridge 100 from separating downward, forward, rearward or sideways from imaging unit 200, In this manner, the only available path for separation of toner cartridge 100 from imaging unit 200 requires rear 111 of toner cartridge 100 to first lift upward relative to imaging unit 200 which then permits toner cartridge 100 to move rearward relative to imaging unit 200 and separate rearward and/or upward from imaging unit 200. In this manner, contact between hook 152 of latch 140 and latching contact surface 252 of latch catch 250 when toner cartridge 100 is installed on imaging unit 200 and latch 140 is in the latching position prevents toner cartridge 100 from separating from imaging unit 200.

In the embodiment illustrated, when toner cartridge 100 is fully installed on imaging unit 200 with latch 140 in the latching position, latch 140 does not contact latch catch 250 or any other portion of imaging unit 200. Clearance between latch 140 and imaging unit 200 avoids disturbing the force balance between developer roll 120 of toner cartridge 100 and photoconductive drum 220 of imaging unit 200, which could result in print defects such as white gapping, and avoids disturbing the gear mesh between interface gear 124 of toner cartridge 100 and drive gear 232 of imaging unit 200. In particular, hook 152 of latch 140 is spaced below latching contact surface 252 of latch catch and above rear wall 238 of imaging unit 200. Hook 152 is also spaced forward (toward front 210 of imaging unit 200) and sideways (toward side 208 of imaging unit 200) from other adjacent portions of latch catch 252. Other aspects of latch 140 (other than hook 152) are also clear of latch catch 250. For example, a portion of camming surface 254 of latch catch 250 extends between, but does not contact, latch 140 and rear 111 of housing 102. Angled surface 164 of camming, extension 160 is also spaced from camming surface 256 of latch catch 250.

In the embodiment illustrated, latch 140 and latch catch 250 are configured to self-latch upon installation of toner cartridge 100 onto imaging unit 200, regardless of the rotational position of latch 140 relative to rotational stops 144, 145. That is, latch 140 can be positioned in the latching position, the unlatching position or any position therebetween during installation of toner cartridge 100 onto imaging unit 200 and latch 140 will clear latch catch 250 and rotate to the latching position upon toner cartridge 100 reaching its final installed position on imaging unit 200. In this embodiment, latch 140 does not include a spring or other form of biasing member that biases latch 140 toward the latching position. Instead, the cam follower surfaces of latch 140 and the corresponding camming surfaces of latch catch 250 are configured to rotate latch 140 to the latching position upon toner cartridge 100 reaching its final installed position on imaging unit 200, regardless of the rotational position of latch 140 when the installation of toner cartridge 100 onto imaging unit 200 begins.

Figure 11A:
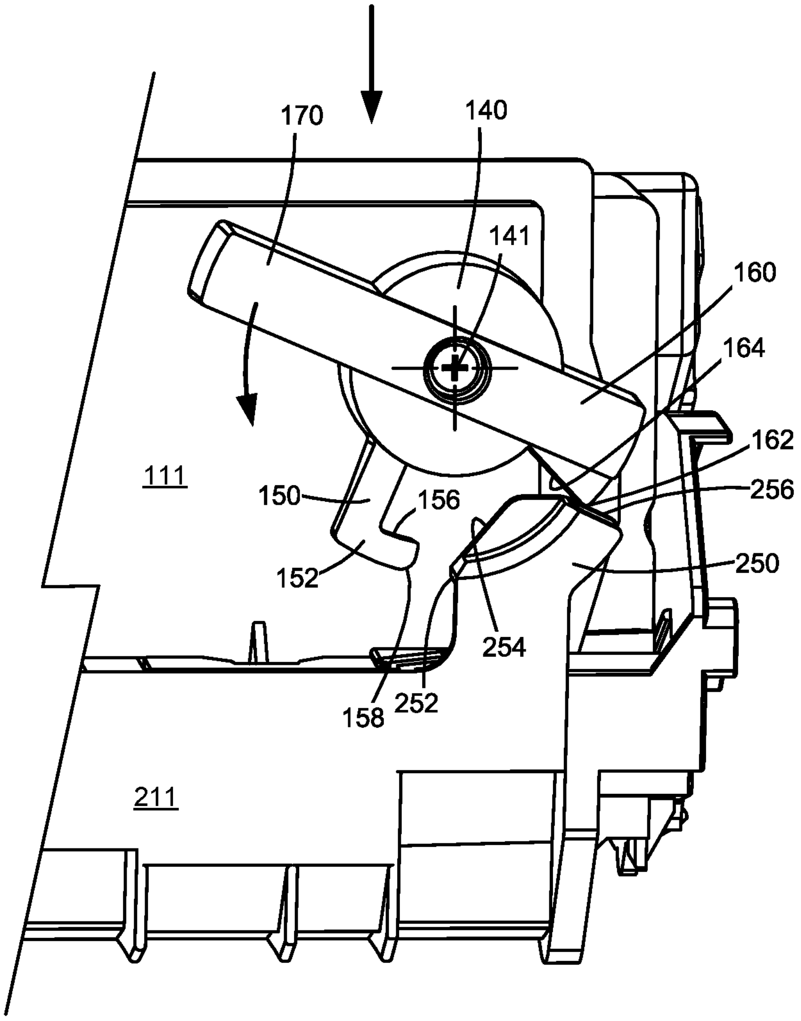
FIGS. 11A and 11B are sequential rear perspective views showing installation of the toner cartridge onto the imaging unit with the latch initially in the unlatching position according to one example embodiment.
Figure 11B:
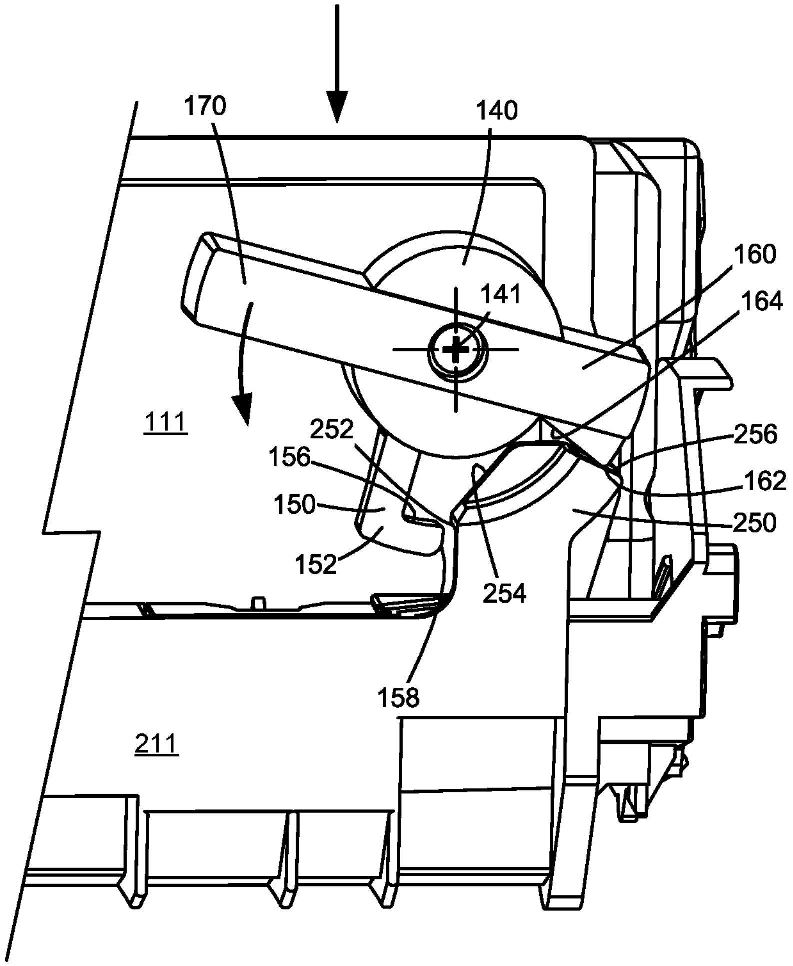

For example, FIGS. 11A and 11B sequentially illustrate the installation of toner cartridge 100 onto imaging unit 200 with latch 140 initially in the unlatching position. To install toner cartridge 100 onto imaging unit 200, a user simply aligns alignment guides 130, 131 of toner cartridge 100 with guide rails 240, 241 of imaging unit 200 and presses toner cartridge 100 downward into toner cartridge receiving area 205 of imaging unit 200, With reference to Figure HA, as toner cartridge 100 lowers into toner cartridge receiving area 205 of imaging unit 200 with latch 140 in the unlatching position, cam follower surface 162 of camming extension 160 contacts camming surface 256 of latch catch 250. As toner cartridge 100 continues to lower into toner cartridge receiving area 205 of imaging unit 200, the contact between cam follower 162 and camming surface 256 causes latch 140 to rotate toward the latching position (counterclockwise as viewed in FIGS. 11A and 11B). As shown in FIG. 11B, cam follower 162 and camming surface 256 are positioned and oriented such that the rotation of latch 140 toward the latching position is timed so that hook 152 of latch 140 clears and passes under latching contact surface 252 of latch catch 250. Toner cartridge 100 continues downward and latch continues rotating toward the latched position until toner cartridge 100 reaches its final installed position on imaging unit 200 and latch 140 reaches the latching position as shown in FIG. 10.

Figure 12A:
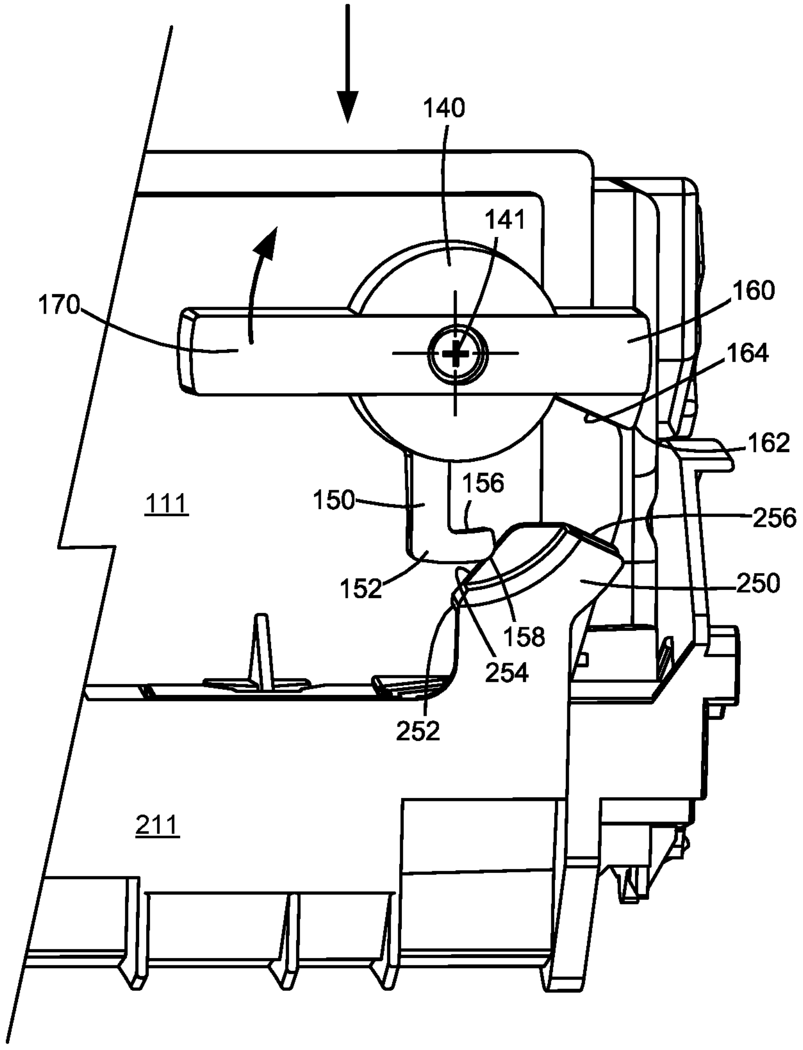
FIGS. 12A and 12B are sequential rear perspective views showing installation of the toner cartridge onto the imaging unit with the latch initially in the latching position according to one example embodiment.
Figure 12B:
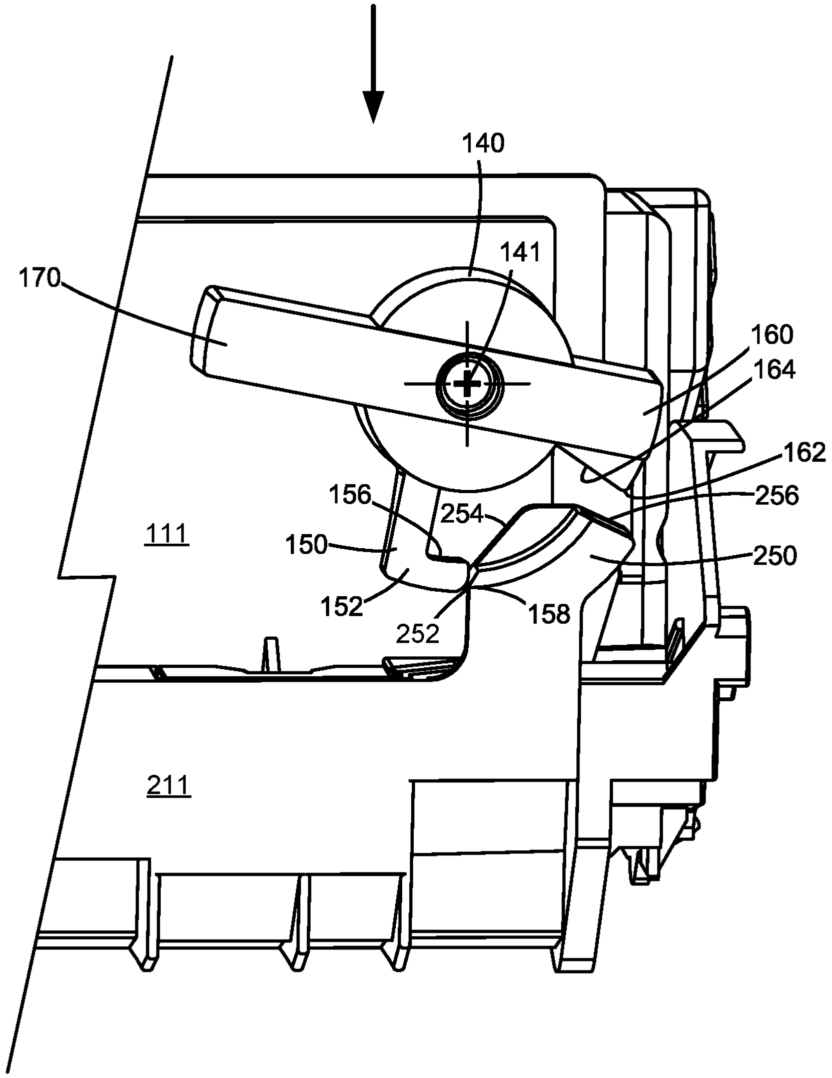

FIGS. 12A and 12B sequentially illustrate the installation of toner cartridge 100 onto imaging unit 200 with latch 140 initially in the latching position. With reference to FIG. 12A, as toner cartridge 100 lowers into toner cartridge receiving area 205 of imaging unit 200 with latch 140 in the latching position, cam follower surface 158 of hook 152 contacts camming surface 254 of latch catch 250. As toner cartridge 100 continues to lower into toner cartridge receiving area 205 of imaging unit 200, the contact between cam follower 158 and camming, to surface 254 causes latch 140 to first rotate toward the unlatching position (clockwise as viewed in FIGS. 12A and 12B). Latch 140 continues to rotate toward the unlatching position until cam follower 158 clears camming surface 254. At this point, hook 152 is clear of latch catch 250 permitting hook 152 to pass alongside latch catch 250 as toner cartridge 100 continues downward into toner cartridge receiving area 205 as shown in FIG. 12B. As toner cartridge 100 continues to lower into toner cartridge receiving area 205, cam follower 162 of camming extension 160 contacts camming surface 256 of latch catch 250 in a manner similar to the position shown in FIG. 11B. Contact between cam follower 162 and camming surface 256 causes latch 140 to rotate back toward the latching position (counterclockwise as viewed in FIGS. 11A, 11B, 12A and 12B) such that hook 152 of latch 140 passes under latching contact surface 252 of latch catch 250. As discussed above, toner cartridge 100 continues downward and latch continues rotating toward the latched position until toner cartridge 100 reaches its final installed position on imaging unit 200 and latch 140 reaches the latching position as shown in FIG. 10.

While FIGS. 11A and 11B illustrate the installation of toner cartridge 100 onto imaging unit 200 with latch 140 initially in the unlatching position and FIGS. 12A and 12B illustrate the installation of toner cartridge 100 onto imaging unit 200 with latch 140 initially in the latching position, latch 140 operates in the same manner if initially positioned intermediate the latching and unlatching positions. Depending on the initial position of latch 140 upon toner cartridge 100 installation onto imaging unit 200, either cam follower 158 or cam follower 162 of latch 140 will contact its corresponding camming surface 254, 256 first, causing latch 140 to rotate so that hook 152 dears latch catch 250 and passes under latching contact surface 252 as discussed above.

Figure 13:
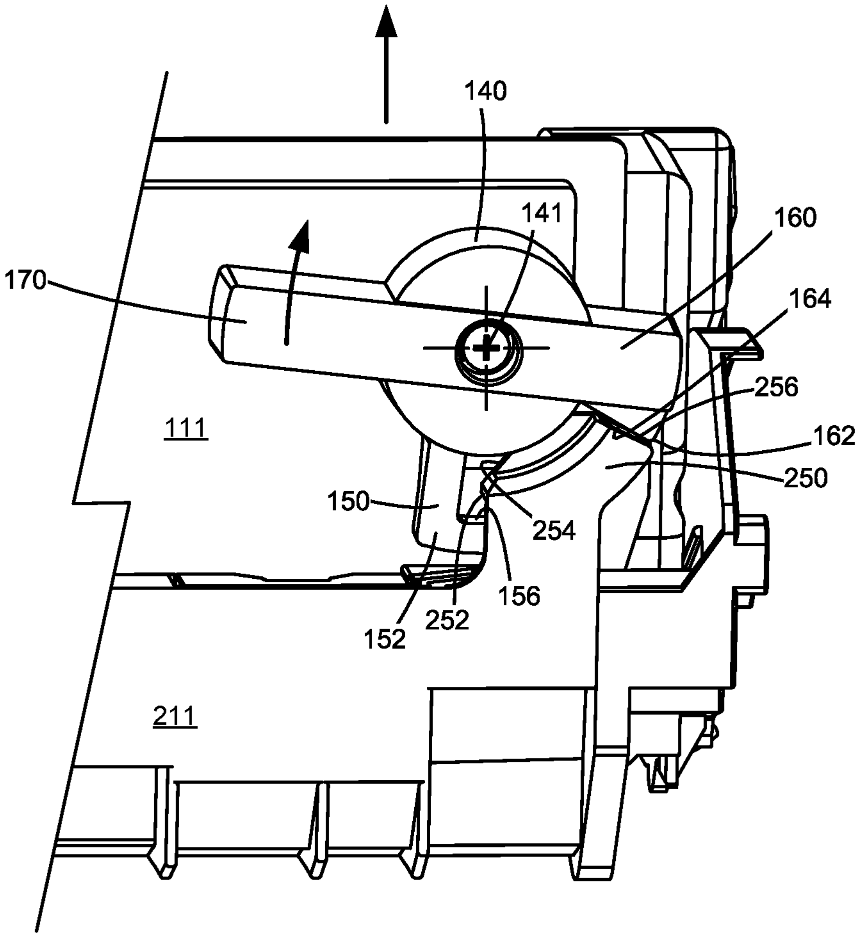
FIG. 13 is a rear perspective view showing unlatching of the toner cartridge from the imaging unit according to one example embodiment.
Figure 14A:
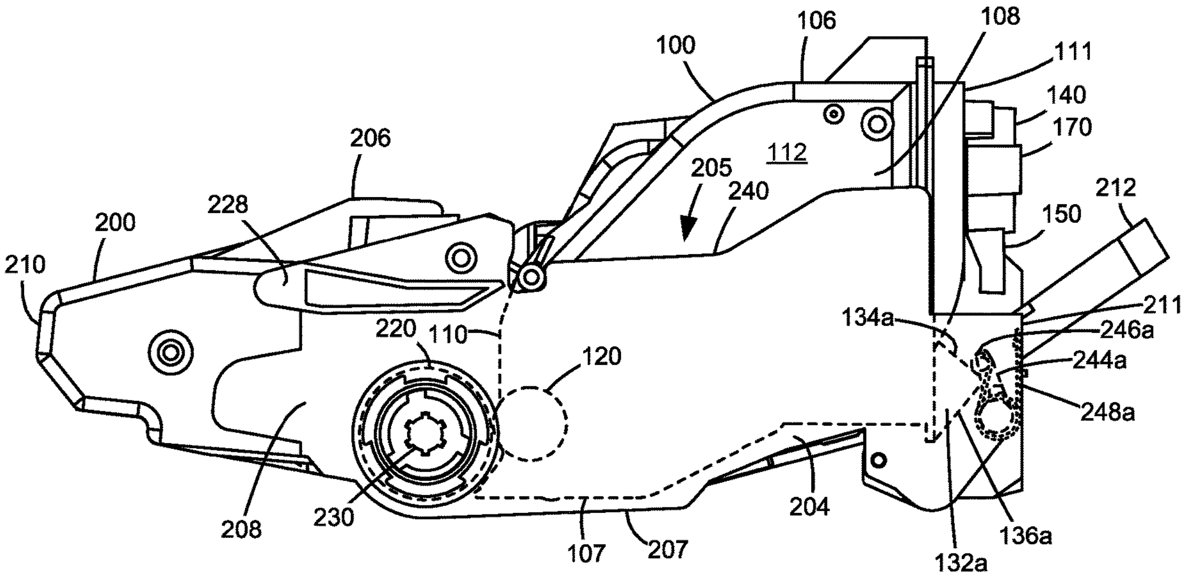
FIGS. 14A and 14B are sequential side elevations views showing the toner cartridge lifting from the imaging unit during unlatching of the toner cartridge from the imaging unit according to one example embodiment.
Figure 14B:
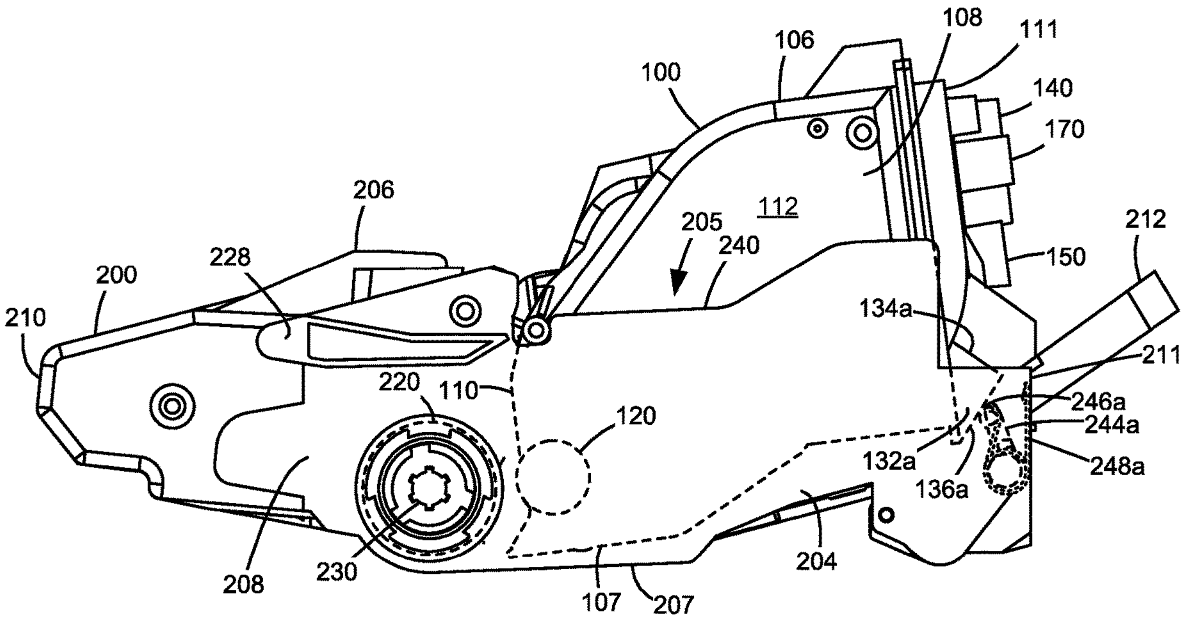

With reference back to FIG. 10, in the embodiment illustrated, in order to release latch 140 to separate toner cartridge 100 from imaging unit 200, a user lifts handle 170 of latch 140 upward causing latch 140 to rotate from the latching position toward the unlatching position (clockwise as viewed in FIG. 10). As shown in FIG. 13, when latch 140 rotates from the latching position toward the unlatching position with toner cartridge 100 fully installed on imaging unit 200, cam follower surface 162 of camming extension 160 contacts camming surface 256 of latch catch 250. Contact between cam follower 162 and camming surface 256 as latch 140 is rotated toward the unlatching position lifts rear 111 of toner cartridge 100 relative to imaging unit 200. Contact between cam follower 162 and camming surface 256 as latch 140 is rotated toward the unlatching position overcomes the bias force applied to engagement members 132*a*, 132*b* by hold-downs 244*a*, 244*h* of imaging unit 200 so that contact surfaces 134*a*, 134*b* of engagement members 132*a*, 132*b* clear hold-downs 244*a*, 244*b* as toner cartridge 100 lifts from imaging unit 200. For example, FIG. 14A shows hold-down 244*a* engaged with contact surface 134*a* of engagement member 132*a* when toner cartridge 100 is fully installed on imaging unit 200, FIG. 14B shows rear 111 of toner cartridge 100 lifted relative to imaging unit 200 with contact surface 134*a* of engagement member 132*a* clear of hold-down 244*a*. While FIGS. 14A and 14B only show the engagement between engagement member 132*a* and hold-down 244*a*, the engagement between engagement member 132*b* and hold-down 244*b* is substantially the same. Once contact surfaces 134*a*, 134*b* of engagement members 132*a*, 132*b* clear hold-downs 244*a*, 244*b*, toner cartridge 100 can be easily removed from imaging unit 200 by a user lifting toner cartridge 100 upward and rearward from imaging unit 200.

Figure 15:
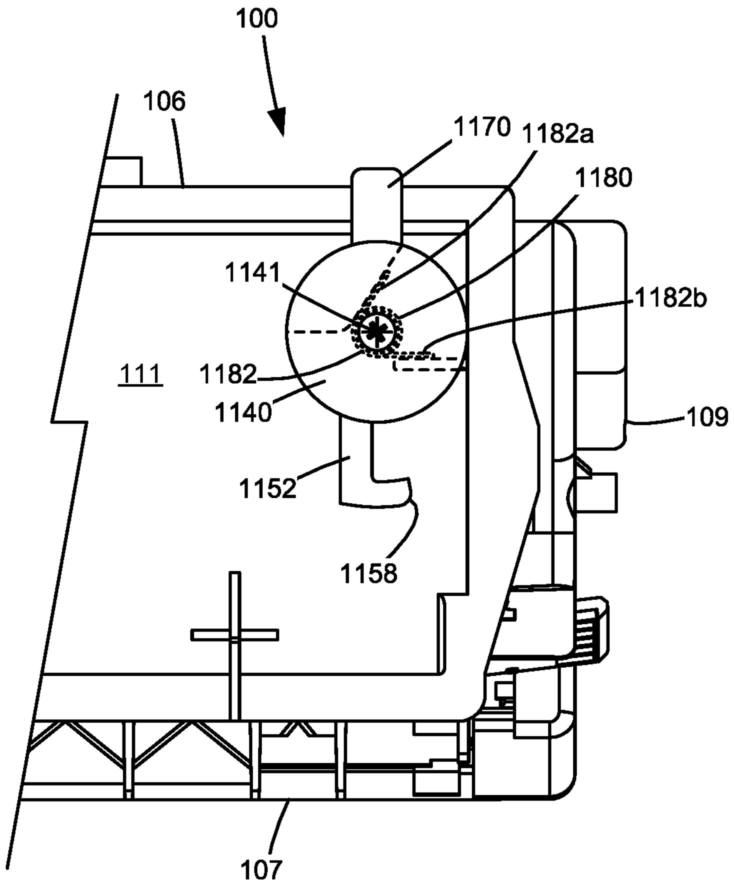
FIG. 15 is a rear elevation view of a toner cartridge showing a latch of the toner cartridge in a latching position according to another example embodiment.

While FIGS. 5-13 illustrate a latch 140 according to one example embodiment, the latch of toner cartridge 100 is not limited to this embodiment and may take other suitable configurations and constructions as desired. For example, FIG. 15 illustrates a latch 1140 in a latching position according to another example embodiment. Latch 1140 is positioned on rear 111 of toner cartridge 100. Latch 1140, like latch 140, is rotatable about a rotational axis 1141 and includes a hook 1152 like hook 152 of latch 140. Latch 1140 includes a handle 1170 that extends opposite hook 1152. In this embodiment, latch 1140 is biased toward the latching position (counterclockwise as viewed in FIG. 15) by a biasing member 1180, such as a spring or other resilient material. For example, in the embodiment illustrated, biasing member 1180 includes a torsion spring 1182 having a first leg 1182*a* anchored to a portion of latch 1140 and a second leg 1182*b* anchored to a portion of rear 111 of toner cartridge 100. When toner cartridge 100 having latch 1140 is installed onto imaging unit 200, a cam follower 1158 of hook 1152 contacts corresponding camming surface 254 on imaging unit 200 causing latch 1140 to rotate toward the unlatching position (clockwise as viewed in FIG. 15) permitting hook 1152 to clear latch catch 250. Once hook 1152 passes latch catch 250, the bias applied by biasing member 1180 returns latch 1140 to the latching position with hook 1152 passing under latching contact surface 252. Accordingly, camming extension 160 of latch 140 may be omitted from latch 1140 since biasing member 1180 rotates latch 1140 to the latching position after hook 1152 clears latch catch 250.

While the example embodiments illustrated include a toner cartridge and an imaging unit removably fixed together by a latch positioned on the toner cartridge and a corresponding latch catch positioned on the imaging unit, those skilled in the art will appreciate that this configuration may be reversed such that the imaging unit includes a latch and the toner cartridge includes a corresponding latch catch. Further, while the example embodiments illustrated include a toner cartridge and an imaging unit latched together, any two replaceable units of an image forming device (e.g., a toner cartridge and a waste toner container) may be selectably latched together in this manner.

Further, although the example embodiments discussed above includes a pair of replaceable units in the form of a toner cartridge 100 that includes the main toner supply for the image forming device and the developer unit and an imaging unit 200 that includes the photoconductor unit for each toner color, it will be appreciated that the replaceable unit(s) of the image forming device may employ any suitable configuration as desired. For example, in one embodiment, the main toner supply for the image forming device is provided in a first replaceable unit and the developer unit and photoconductor unit are provided in a second replaceable unit. Other configurations may be used as desired.

Further, it will be appreciated that the architecture and shape of toner cartridge 100 and imaging unit 200 illustrated is merely intended to serve as an example. Those skilled in the art understand that toner cartridges, and other toner containers, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various Modifications that naturally follow. All modifications and variations are contemplated within the scope of the present disclosure as determined by the appended claims. Relatively apparent modifications include combining one or more features of various embodiments with features of other embodiments.

The invention claimed is:

1. A first replaceable unit for use with a second replaceable unit in an electrophotographic image forming device, comprising:

a housing having a reservoir for holding toner; and a latch movable relative to the housing between a latching position for latching the first replaceable unit to the second replaceable unit and an unlatching position for permitting the first replaceable unit to separate from the second replaceable unit, the latch includes a latching contact surface for contacting a corresponding latch catch on the second replaceable unit in order to prevent the first replaceable unit from separating from the second replaceable unit when the first replaceable unit is mated with the second replaceable unit and the latch is in the latching position, the latch includes a first cam follower surface for contacting a corresponding first camming surface on the second replaceable unit during mating of the first replaceable unit with the second replaceable unit to cause the latch to move in a first direction, wherein the first replaceable unit does not include a biasing member biasing the latch relative to the housing toward the latching position or toward the unlatching position.

2. The first replaceable unit of claim 1, further comprising an outlet in fluid communication with the reservoir for exiting toner from the housing to the second replaceable unit.

3. The first replaceable unit of claim 2, wherein the outlet is positioned on the front of the housing, and the latch is positioned on the rear of the housing.

4. The first replaceable unit of claim 1, wherein the latch includes a second cam follower surface for contacting a corresponding second camming surface on the second replaceable unit during mating of the first replaceable unit with the second replaceable unit to cause the latch to move in a second direction.

5. The first replaceable unit of claim 1, wherein the latch is rotatable about a rotational axis relative to the housing between the latching position and the unlatching position.

6. The first replaceable unit of claim 5, wherein the latch includes a second cam follower surface for contacting a corresponding second camming surface on the second replaceable unit during mating of the first replaceable unit with the second replaceable unit to cause the latch to move in a second direction, wherein the latch includes a first extension and a second extension spaced angularly relative to the rotational axis from the first extension, wherein the latching contact surface is positioned on the first extension, and the first cam follower surface is positioned on the second extension.

7. The first replaceable unit of claim 6, wherein the second cam follower surface is positioned on the first extension.

8. The first replaceable unit of claim 6, wherein the latch includes a third extension spaced angularly relative to the rotational axis from the first extension and from the second extension, the third extension includes a handle permitting a user to manually rotate the latch between the latching position and the unlatching position.

* * * * *